United States Patent
Komatsu et al.

(10) Patent No.: US 11,733,176 B2
(45) Date of Patent: Aug. 22, 2023

(54) INSPECTION DEVICE AND METHOD OF MEASURING WAVEFRONT ABERRATION

(71) Applicant: SAMSUNG ELECTRONICS CO., LTD., Suwon-si (KR)

(72) Inventors: Akihiro Komatsu, Yokohama (JP); Ken Ozawa, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/648,426

(22) Filed: Jan. 20, 2022

(65) Prior Publication Data

US 2022/0268709 A1 Aug. 25, 2022

(30) Foreign Application Priority Data

Feb. 25, 2021 (JP) .................................. 2021-28195
Sep. 17, 2021 (KR) ........................ 10-2021-0124858

(51) Int. Cl.
*G01N 21/95* (2006.01)
*G01M 11/02* (2006.01)

(52) U.S. Cl.
CPC ..... *G01N 21/9501* (2013.01); *G01M 11/0257* (2013.01); *G01N 2201/021* (2013.01);
(Continued)

(58) Field of Classification Search
CPC ........... G01M 11/0257; G01N 21/9501; G01N 2201/021; G01N 2201/0633;
(Continued)

(56) References Cited

U.S. PATENT DOCUMENTS

| 5,828,455 A | 10/1998 | Smith et al. |
| 9,658,114 B1 * | 5/2017 | Tang .................... G01J 9/02 |

FOREIGN PATENT DOCUMENTS

| JP | 2004-014865 | 1/2004 |
| WO | WO 00/65318 | 11/2000 |

OTHER PUBLICATIONS

M.Takeda et al. "Fourier-transform method of fringe-pattern analysis for computer-based topography and interferometry", J.Opt.Soc. Am/vol. 72,No. 1/Jan. 1982.

(Continued)

*Primary Examiner* — Tri T Ton
(74) *Attorney, Agent, or Firm* — F. Chau & Associates, LLC

(57) ABSTRACT

An inspection device includes an objective lens that transmits inspection light reflected from a sample during inspection and measurement light from a point light source during aberration measurement, a first pupil relay lens that transmits the inspection light and the measurement light, a second pupil relay lens in which an intermediate imaging plane is formed between the second pupil relay lens and the first pupil relay lens, a diffraction grating disposed between the first pupil relay lens and the intermediate imaging plane and that diffracts the measurement light, a point diffraction interferometry plate disposed within a depth of focus of the intermediate imaging plane and that selectively transmits the diffracted light, a first detector that detects an image of the sample, and a second detector that detects a fringe image of the measurement light.

20 Claims, 6 Drawing Sheets

(52) U.S. Cl.
CPC ............... *G01N 2201/0633* (2013.01); *G01N 2201/0635* (2013.01); *G01N 2201/0636* (2013.01)

(58) Field of Classification Search
CPC ... G01N 2201/0635; G01N 2201/0636; G01N 2021/9583; G01N 21/958
USPC .......................................... 356/239.1–239.8
See application file for complete search history.

(56) References Cited

OTHER PUBLICATIONS

H Medecki, et al. "Phase-shifting point diffraction interferometer", Optics Letters / vol. 21. No. 19 / Oct. 1, 1996.
N. Farrar, et al. "In-situ measurement of lens aberrations", Proc. SPIE, 4000 (2000)18-29.

* cited by examiner ations.
INSPECTION DEVICE AND METHOD OF MEASURING WAVEFRONT ABERRATION

CROSS TO REFERENCE TO RELATED APPLICATION(S)

This application claims priority under 35 U.S.C. § 119 from Japanese Patent Application No. 2021-28195, filed on Feb. 25, 2021 in the Japan Patent Office, and from Korean Patent Application No. 10-2021-0124858, filed on Sep. 17, 2021 in the Korean Intellectual Property Office, the contents of both of which are herein incorporated by reference in their entireties.

TECHNICAL FIELD

Exemplary embodiments of the present disclosure are directed to an inspection device and a method of measuring wavefront aberrations, and more particularly, to an inspection device that measures wavefront aberrations, which is an imaging performance of a optical semiconductor inspection device, in-situ, and a method of measuring wavefront aberrations.

DISCUSSION OF THE RELATED ART

An optical inspection device for manufacturing a semiconductor device has become larger with shorter wavelengths, a greater number of apertures, and more functionalities. An optical inspection device optically inspects a semiconductor device using an optical microscope that includes an objective lens and an imaging lens. Each single unit of an objective lens and an imaging lens is precisely adjusted by a device manufacturer using a dedicated wavefront aberration measuring equipment, such as an interferometer. However, wavefront aberrations of the objective lens and the imaging lens might not be quantitatively measured in the actual operating state after the lenses are mounted on an optical inspection device or after shipment and transportation thereof, and after a semiconductor manufacturing plant is installed. In addition, aberrations when the objective lens and the imaging lens are combined might not be quantitatively measured due to limitations in the wavefront aberrations measuring equipment owned by the device manufacturer. Even after operating a semiconductor manufacturing plant, when impacts are applied to or there has been a change in the performance in an imaging optical system, the quantitative measurement of the imaging performance in real operations may be necessary in terms of semiconductor production management.

As for a reduction projection system such as an exposure device for manufacturing a semiconductor, since a projection lens can be integrated with an objective lens and an imaging lens, the lenses may be already combined. In addition, wavefront aberrations can be measured integrally and in-situ.

SUMMARY

An exemplary embodiment of the present disclosure provides an inspection device that measures wavefront aberrations, which is an imaging performance of an optical inspection device, in-situ with high precision, and a method of measuring wavefront aberrations.

According to an exemplary embodiment of the present disclosure, an inspection device includes a stage that accommodates a sample during an inspection and a point light source during an aberration measurement, an objective lens that transmits inspection light formed by illumination light that illuminates the sample and is reflected from the sample during the inspection, and that transmits measurement light emitted from the point light source during the aberration measurement, a first lens that transmits the inspection light and the measurement light received from the objective lens, a second lens that transmits the inspection light and the measurement light received from the first lens, where an intermediate imaging plane is formed between the first lens and the second lens, a diffraction grating disposed between the first lens and the intermediate imaging plane and that diffracts the measurement light, and a point diffraction interferometry (PDI) plate disposed within a range of a depth of focus of the intermediate imaging plane, wherein the PDI plate includes a large hole and a small hole that has an inner diameter that is smaller than that of the large hole, where the large hole is disposed on an optical axis of the measurement light, and the small hole is spaced apart from the large hole, and the PDI plate transmits light diffracted by the diffraction grating. The diffraction grating and the PDI plate are withdrawn from an optical path of the inspection light during the inspection.

According to an exemplary embodiment of the present disclosure, a method of measuring wavefront aberration of an inspection device includes disposing a point light source on a stage, transmitting measurement light emitted from the point light source by an objective lens, transmitting the measurement light received from the objective lens by a first lens, diffracting the measurement light received from the first lens by a diffraction grating disposed between the first lens and an intermediate imaging plane, transmitting the measurement light received from the diffraction grating by a PDI plate disposed within a depth of focus of the intermediate imaging plane, wherein the PDI plate includes a large hole on an optical axis of the measurement light, a small hole spaced apart from the large hole and whose an inner diameter is smaller than that of the large hole, transmitting the measurement light received from the PDI plate by a second lens, wherein the intermediate imaging plane is formed between the first lens and the second lens, and detecting a fringe image of the measurement light received from the second lens by a second detector disposed on a pupil conjugate plane of the measurement light.

DETAILED DESCRIPTION

Hereinafter, embodiments of the present disclosure will be described as follows with reference to the accompanying drawings.

Hereinafter, an inspection device will be described according to an exemplary embodiment. The inspection device in an exemplary embodiment includes a sample inspection system that inspects a sample such as a semiconductor device wafer, and a measurement optical system that measures wavefront aberration of an objective lens in the inspection device. First, a configuration of a sample inspection system will be described. Thereafter, a configuration of an aberration measuring optical system will be described. Thereafter, a sample inspection method and a wavefront aberration measurement method that uses the inspection device will be described.

Configuration of Sample Inspection System

Figure 1:
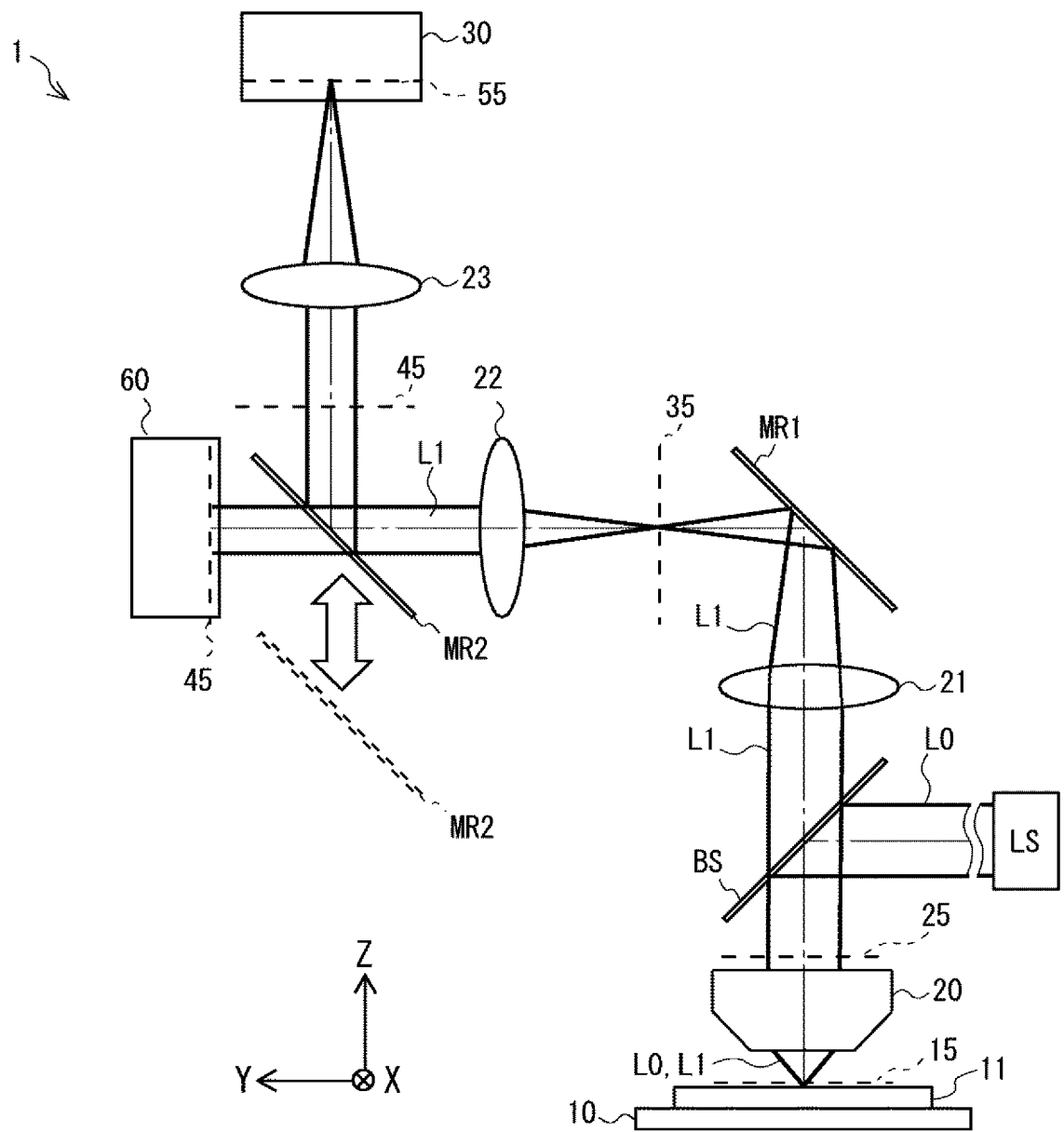
FIG. 1 illustrates a sample inspection system with respect to an inspection device according to an exemplary embodiment of the present disclosure.

FIG. 1 illustrates a sample inspection system of an inspection device according to an exemplary embodiment. As illustrated in FIG. 1, an inspection device 1 includes a light source LS, a beam splitter BS, a stage 10, an objective lens 20, a pupil relay lens 21, a pupil relay lens 22, a tube lens 23, and a detector 30. The inspection device 1 also includes other optical members, such as mirrors MR1 and MR2, as needed or desired.

The light source LS may be implemented as a UV lamp or a laser produced plasma (LPP) light source, etc., and generates and emits illumination light L0. The emitted illumination light L0 is partially reflected by the beam splitter BS and is incident to the objective lens 20. The illumination light L0 incident to the objective lens 20 propagates through the objective lens 20. The illumination light L0 is focused by the objective lens 20.

The stage 10 is disposed on an optical axis of the objective lens 20. A sample 11 may be disposed on the stage 10. The sample 11 may be, for example, a wafer on which a semiconductor device is formed. However, the sample 11 is not limited to a wafer on which a semiconductor device is formed, and may be a wafer such as a semiconductor substrate, or may be a member for manufacturing a semiconductor device, such as a photomask.

In describing the inspection device 1, an X-YZ rectangular coordinate axis system is introduced for ease of description. The optical axis of the objective lens 20 is parallel to a Z-axis direction, and an imaging plane of the stage 10 is parallel to an X-Y plane.

The illumination light L0 focused by the objective lens 20 illuminates the sample 11. The illumination light L0 that illuminates the sample 11 is reflected by a sample surface 15 of the sample 11. The light reflected from the sample surface 15 of the sample 11 is referred to as inspection light L1. The inspection light L1 is incident to the objective lens 20. The inspection light L1 propagates through the objective lens 20, and the inspection light L1 is collimated into parallel light by the objective lens 20. As described above, the objective lens 20 transmits the inspection light L1 reflected by the sample 11 from the illumination light L0 that illuminates the sample 11. The inspection light L1 transmitted through the objective lens 20 is partially transmitted by the beam splitter BS and is incident to the pupil relay lens 21.

When the inspection light L1 is incident to the pupil relay lens 21, a pupil plane 25 is located between the objective lens 20 and the pupil relay lens 21, and a pupil image forms in the pupil plane 25. When the pupil plane 25 is located internal or external of the objective lens 20, usually, the pupil relay lens 21 and the pupil relay lens 22 are used to relay an image, and a pupil image can form on a focal plane 45 of the pupil relay lens 22. In addition, a filter and an aperture can be disposed on the pupil conjugate plane 45 in the main light path on the reflection side of MR2, instead of disposing the filter and the aperture on the pupil plane 25.

A focal length of the pupil relay lens 21 may be, for example, about 50 times greater than a focal length of the objective lens 20, and an enlarged image of the sample 11 forms on an intermediate imaging plane 35. For example, assuming that the magnification is 50 and the numerical aperture (NA) of the objective lens 20 is 0.9, the NA of the relay lens 21 may be 0.9/50=0.018. However, the NA of the objective lens 20 is not limited thereto. For example, the NA of the objective lens 20 may be 0.85-0.9 or 0.9-0.95 in exemplary embodiments. The pupil relay lens 21 transmits the incident inspection light L1, and the inspection light L1 is focused by the pupil relay lens 21. Accordingly, an intermediate image of the sample 11 forms on the intermediate imaging plane 35 between the pupil relay lens 21 and the pupil relay lens 22.

As described above, in an embodiment, the pupil relay lens 21 transmits the inspection light L1 received from the objective lens 20 and has apertures, the number of which may be smaller than that of the apertures of the objective lens 20.

The pupil relay lens 22 transmits the inspection light L1 received from the pupil relay lens 21, and the pupil relay lens 22 collimates the inspection light L1 into parallel light. The intermediate imaging plane 35 is located between the pupil relay lens 21 and the pupil relay lens 22, and the intermediate image forms in the intermediate imaging plane 35. The inspection light L1 transmitted through the pupil relay lens 21 is reflected by a mirror MR1 to be incident to the pupil relay lens 22.

The magnification of the intermediate image on the intermediate imaging plane 35 is determined by a ratio between the focal length of the objective lens 20 and the focal length of the pupil relay lens 21. The magnification of the intermediate phase may be, for example, 50 or more times, or 50-70 times. The magnification of the intermediate phase is not limited thereto.

The inspection light L1 transmitted through the pupil relay lens 22 becomes, for example, parallel light. The inspection light L1 transmitted through the pupil relay lens 22 is incident to the tube lens 23. The inspection light L1 transmitted through the pupil relay lens 22 is reflected by the mirror MR2 to be incident to the tube lens 23. The pupil conjugate plane 45 is located between the pupil relay lens 22 and the tube lens 23. In addition, the pupil conjugate plane 45 is located on the transmission side of mirror MR2.

The inspection light L1 transmitted through the relay lens 22 is focused by the tube lens 23. The tube lens 23 includes a plurality of lenses having different focal lengths. Accordingly, a plurality of imaging magnifications can be implemented. The tube lens 23 can be implemented by switching lenses having different focal lengths. Accordingly, an imaging conjugate plane 55 is located on a detection plane of the detector 30, and the image of the sample surface 15 of the sample 11 is formed in the imaging conjugate plane 55.

The detector 30 is disposed on the imaging conjugate plane 55 of the inspection light L1 received from the pupil relay lens 22. For example, the detector 30 is disposed on the imaging conjugate plane 55 on which the inspection light L1 received from the pupil relay lens 22 is imaged by the tube lens 23. The detector 30 detects the image of the sample surface 15 of the sample 11. The magnification of the image of the sample surface 15 on the detection plane of the detector 30 may be, for example, 70 times-300 times. The detector 30 can be implemented by, for example, a camera. The detector 30 includes an image sensor. For example, the image sensor records the image of the sample surface 15.

In an embodiment, the inspection device 1 is implemented by, for example, a large-sized microscope. Since the entire optical path in the inspection device 1 is elongated, for example, about 3-5 m in length, the inspection device 1 includes several refractive mirrors. In the inspection device 1 in an exemplary embodiment, by introducing the inspection light L1 into the sample inspection system by withdrawing or semi-transmitting a refractive mirror from the optical path, the imaging conjugate plane 55 can be observed. During an aberration measurement, a point light source that emits light is disposed on the sample surface 15, mirror MR2 is withdrawn, and the measurement light is introduced into the aberration measurement optical system such that the pupil conjugate plane 45 can be observed using a detector 60.

Configuration of Aberration Measurement System

Figure 2:
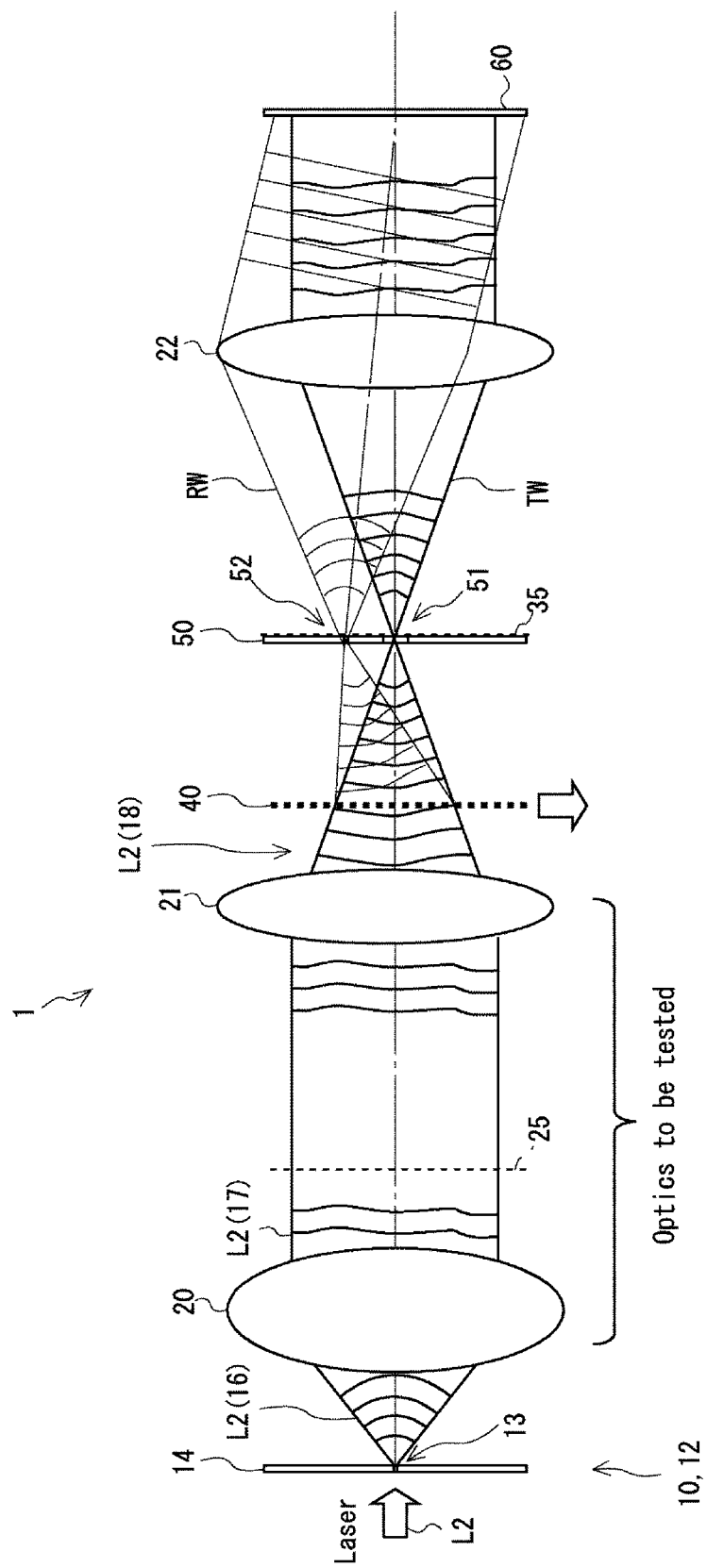
FIG. 2 illustrates a measurement optical system for measuring wavefront aberration of an objective lens and a relay lens with respect to an inspection device according to an exemplary embodiment of the present disclosure.

A configuration of an aberration measuring system according to an embodiment for measuring aberration of the objective lens 20 and the pupil relay lens 21 will be described. FIG. 2 illustrates an aberration measuring system of an inspection device 1 that measures aberration of an objective lens 20 and a relay lens 21 according to an exemplary embodiment. As illustrated in FIG. 2, the inspection device 1 includes a point light source generating unit 12, a diffraction grating 40, a point diffraction interferometry (PDI) plate 50, and a detector 60 that measures wavefront aberration of the objective lens 20 and the pupil relay lens 21.

The point light source generating unit 12 emits the inspection light L2 that includes an ideal spherical wave 16. Accordingly, the point light source generating unit 12 functions as a point light source. The point light source generating unit 12 is disposed on the stage 10. Accordingly, the sample 11 or the point light source may be disposed on the stage 10. The point light source generating unit 12 includes, for example, a laser light source, a lens that focuses a laser beam emitted from the laser light source, and a pinhole plate 14 on which a pinhole 13 is formed.

One plate surface or one pattern surface of the pinhole plate 14 opposes the objective lens 20. The one plate surface of the pinhole plate 14 and the sample surface 15 of the sample 11 are disposed in the same position on the optical axis of the objective lens 20. The inner diameter of the pinhole 13 is configured to be λ/(NA of the objective lens 20) or less. For example, when the wavelength of the laser beam of the measurement light L2 is 355 nm and the NA of the objective lens 20 is 0.9, the inner diameter of the pinhole 13 is 394 nm or less.

The laser light source can be implemented as, for example, a diode pumped solid state laser (DPSS laser). The laser beam irradiates the other plate surface of the pinhole plate 14, opposite from the one plate surface. Accordingly, the laser beam passes through the pinhole 13 from the other plate surface of the pinhole plate 14. Accordingly, the measurement light L2, which has an ideal spherical wave, is formed by the laser beam and passes through and is diffracted by the pinhole 13. As described above, the point light source generating unit 12 emits the measurement light L2 as a point light source.

The measurement light L2 emitted from the point light source generating unit 12 includes the spherical wave 16. The measurement light L2 is transmitted through the objective lens 20, and the measurement light L2 is collimated by the objective lens 20. For example, the inspection light L2 transmitted through the objective lens 20 is converted into parallel light. As described above, the objective lens 20 transmits the measurement light L2 received from the point light source.

When the objective lens 20 has no aberration, the measurement light L2 transmitted through the objective lens 20 is an ideal plane wave. However, when the objective lens 20 includes an aberration, the measurement light L2 transmitted therethrough becomes a distorted plane wave 17.

The measurement light L2 transmitted through the objective lens 20 is incident to the pupil relay lens 21. A pupil plane 25 is located between the objective lens 20 and the pupil relay lens 21, and a pupil image forms in the pupil plane 25. The pupil relay lens 21 and the pupil relay lens 22 are located such that a pupil image is relay-formed on the pupil plane 25. The measurement light L2 is transmitted through and focused by the pupil relay lens 21. Accordingly, the intermediate imaging plane 35 is located between the pupil relay lens 21 and the relay lens 22, and an intermediate image of the point light source forms on the intermediate imaging plane 35. Since the measurement light L2 incident to the pupil relay lens 21 may be the distorted plane wave 17 that includes an aberration of the objective lens 20, the measurement light L2 transmitted through the pupil relay lens 21 may include a distorted spherical wave 18.

The diffraction grating 40 is disposed between the pupil relay lens 21 and the intermediate imaging plane 35. The diffraction grating 40 may be configured as a transmissive type or a reflective type, but in an exemplary embodiment, the diffraction grating 40 is a transmissive type. The diffraction grating 40 diffracts the inspection light L2 received from the objective lens 20 and the pupil relay lens 21 into 0th light, ±1st light, ±2nd light, . . . , ±nth light. The diffracted light of each order forms a focusing spot on the intermediate imaging plane 35.

The diffraction grating 40 can move by 0, ¼, ½, ¾ step of the pitch of the grating in the direction of the grating pitch by an actuator that moves in one dimension. For example, the actuator moves the diffraction grating 40 in the Y-axis direction. Accordingly, the phase of the +1st (−1st) diffracted light is modulated by 0, $\pi/2$, $\pi$, $3\pi/2$.

In an embodiment, the transmission-type diffraction grating 40 is implemented by a thin plate in which gratings are formed in a line and space shape. If a line-and-space pattern is formed on a light shielding thin film on a glass substrate, spherical aberrations can occur due to a thickness of the glass substrate. Accordingly, the transmission-type diffraction grating 40 is implemented by a thin plate in which a line-and-space grating is formed by photo etching or photo electroforming. The gratings of the diffraction grating 40 are hollow. The gratings of the diffraction grating 40 may be filled with air or a predetermined gas, or be filled with decompressed air or a decompressed predetermined gas.

The minimum line-and-space dimension formed by photoetching or electroforming process may be, for example, several tens of micrometers. In the inspection device 1 in an exemplary embodiment, an image of the diffraction grating 40 may be disposed in the space where an image is magnified by about 50-70 times. Accordingly, even the diffraction grating 40 having a line-and-space dimension of several tens of micrometers can satisfy a desired condition. Accordingly, a metal freestanding film that has a line-and-space dimension on the nanometer order need not be used by an advanced and expensive process to form the diffraction grating 40, and manufacturing costs can be reduced.

Figure 3:
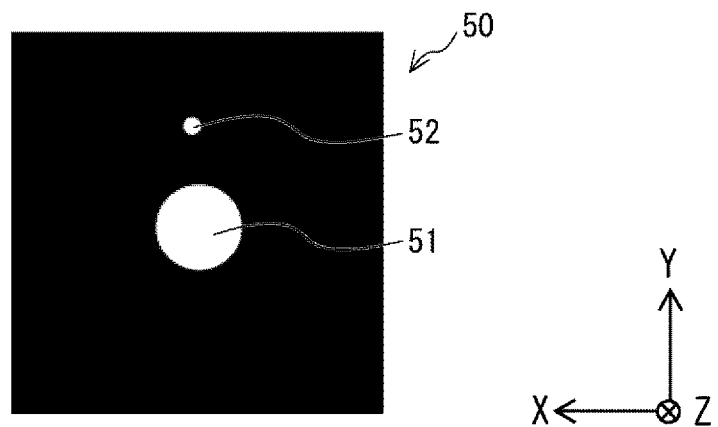
FIG. 3 is a plan diagram of a PDI plate of an inspection device according to an exemplary embodiment of the present disclosure.

The PDI plate 50 is disposed within a predetermined range of the intermediate imaging plane 35. The PDI plate 50 is plate-shaped. FIG. 3 is a plan diagram illustrating a PDI plate 50 with respect to an inspection device 1 according to a first exemplary embodiment.

As illustrated in FIG. 3, in an embodiment, the PDI plate 50 includes a plurality of holes. For example, the PDI plate 50 includes a large hole 51 and a small hole 52 that has an inner diameter smaller than that of the large hole 51. The large hole 51 and the small hole 52 penetrate the PDI plate 50. For example, the large hole 51 and the small hole 52 are hollow. Accordingly, the large hole 51 and the small hole 52 can be filled with air or a predetermined gas, or be filled with decompressed air or a decompressed predetermined gas.

The large hole 51 is disposed on the optical axis of the measurement light L2. Specifically, the central axis of the large hole 51 is located on the optical axis of the measurement light L2. The small hole 52 is spaced apart in the Y-axis direction from the large hole 51. The central axis of the small hole 52 is located at the converging point of the +1st diffracted light or the −1st diffracted light.

The inspection light L2, which includes the distorted spherical wave 18, is incident to the large hole 51. The measurement light L2 that propagates through the large hole 51 still includes the distorted spherical wave 18. The measurement light L2 that propagates through the large hole 51 is called a test wave TW. The +1st diffracted light or the −1st diffracted light of the measurement light L2, which includes the distorted spherical wave 18, is incident to the small hole 52. The small hole 52 has an inner diameter similar to the pinhole 13× the intermediate image magnification. The measurement light L2 transmitted through and emitted from the small hole 52 becomes an ideal spherical wave 16. Accordingly, the measurement light L2 emitted from the small hole 52 may become a reference wave RW. As described above, the PDI plate 50 transmits the diffracted light received from the diffraction grating 40 through the large hole 51 and the small hole 52.

A diameter Φr of the small hole 52 satisfies equation (1), below:

$$\Phi r < 0.61 \cdot \lambda / (NA/M). \quad (1)$$

In the equation, λ is the wavelength of the measurement light L2, NA is the numerical aperture of the point light source generating unit 12 side of the objective lens 20, and M is the magnification in the intermediate imaging plane 35 as determined by the ratio of the focal length of the objective lens 20 and the focal length of the pupil relay lens 21. The coefficient 0.61 indicates the radius of an airy disk. By satisfying equation (1), the reference wave 19 transmitted through and diffracted by the small hole 52 is reset to the ideal spherical wave 16 as illustrated in the drawing. For example, when the wavelength λ of the measurement light L2 is 355 nm, the NA of the point light source generating unit 12 side of the objective lens 20 is 0.9, and the magnification M on the intermediate imaging plane 35 is 70, the diameter φr is 16.8 μm. A hole of diameter φr=16.8 μm can be formed by an above-described photoetching or electroforming process.

In addition, a diameter Φt of the large hole 51 satisfies equation (2) as below:

$$\Phi t > 30 \cdot 0.61 \cdot \lambda / (NA/M). \quad (2)$$

The measurement light L2 (0th light) transmitted through the objective lens 20 and the pupil relay lens 21 spread apart on the PDI plate 50 plane due to aberration. The distortion of the measurement light L2 is related to the aberration. Accordingly, the diameter of the large hole 51 can be varied. The number 30 in equation (2) is a coefficient, and by increasing the coefficient, higher-order aberrations can be measured. However, in the optical inspection device 1, about 30 may be a minimum. For example, assuming that the wavelength λ of the measurement light L2 is 355 nm, the NA is 0.9, and the magnification M in the intermediate imaging plane 35 is 70, Φt is about 500 μm.

The dimensions of the large hole 51 and the small hole 52 of the PDI plate 50 is on the order of several-hundreds μm, and accordingly, the holes can be formed by a patterning process on a general glass substrate, or an above-mentioned photo-etching or electroforming. When using the large hole 51 and the small hole 52 on the glass substrate, the substrate side is located on the emission side.

When the PDI plate 50 is formed by a patterning process, an anti-reflection coating is formed to avoid multiple reflections on the front and rear surfaces of the glass substrate. When the PDI plate 50 is formed by a photoetching or electroforming process, an interference arc caused by unnecessary multiple reflection can be prevented, and to reduce light loss, a thickness of the PDI plate satisfies equation (3), below:

$$\text{PDI plate thickness} < \lambda / (NA/M)$$

For example, when the wavelength λ of the measurement light L2 is 355 nm, the NA of the objective lens 20 is 0.9, and the magnification M in the intermediate imaging plane 35 is 70, the PDI plane thickness is about 28 μm. However, when using a photoetching or electroforming process, when the thickness is thin, mechanical strength may be lacking. Accordingly, a two-stage configuration is used in which the periphery of the large hole 51 and the small hole 52 is thin. For example, the thickness of the periphery of the large hole 51 and the small hole 52 in the PDI plate 50 is the PDI plate thickness, and the thickness of the portion that surrounds the periphery of the PDI plate 50 is at least twice the PDI plate thickness, to increase mechanical strength. Accordingly, mechanical strength can be secured, and loss of light can be prevented. The photoetching or electroforming can be configured as a two-stage process.

The test wave TW that passes through the large hole 51 and the reference wave RW that passes through the small hole 52 propagate through the pupil relay lens 22. As described above, the pupil relay lens 22 transmits the measurement light L2, which includes the test wave TW and the reference wave RW. The test wave TW and the reference wave RW form a fringe image of a one-dimensional inclined plane wave on the detection plane of the detector 60.

The detector 60 is disposed on the pupil conjugate plane 45 of the measurement light L2 received from the pupil relay lens 22. The detector 60 detects a fringe image of the measurement light L2. The detector 60 is implemented by, for example, a camera. The detector 60 includes an image sensor. For example, the image sensor records the aforementioned interference arc.

The detector 60 is disposed in front of the mirror MR2 in FIG. 1. When the measurement is performed using an aberration meter, the mirror MR2 is removed from the optical path. The detector 60 is not disposed on the pupil conjugate plane 45 on the optical path on the MR2 reflection side of the sample inspection system. The pupil conjugate plane 45 on the optical path of the sample inspection system is usually equipped with a plurality of apertures, optical filters, and the like, as switchable equipment. Accordingly, removing the optical members from the optical path of the sample inspection system can affect imaging performance of the optical path of the sample inspection system. By arranging the detector 60 for interferometric image recording on the pupil conjugate plane 45 in the aberration measurement system on the transmission side of the MR2, the performance of a sample inspection system is not influenced.

To obtain the wavefront aberration from the fringe image, a known fringe scanning method may be used. The method obtains four fringe images in four phases by shift driving, which moves the diffraction grating 40 in one-dimension. The wavefront aberrations, which are in units of radians or angles divided by 2n, is obtained in units of pixels of the detector 60 by calculations of the four fringe images. Due to statistical variation in the measurements, the fringe image per phase is averaged over a plurality of images.

Figure 4:
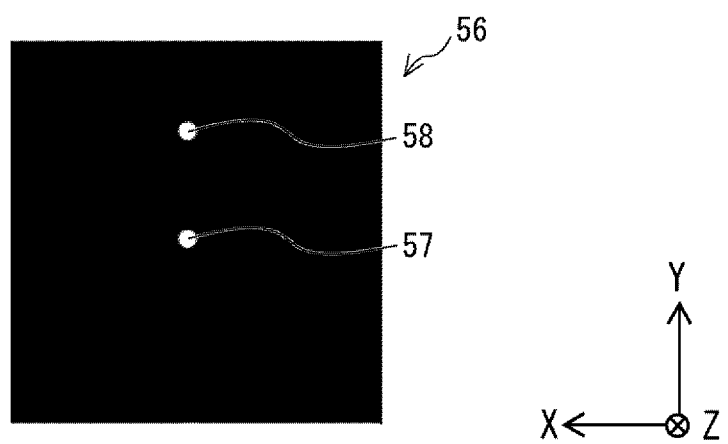
FIG. 4 is a plan diagram of a Null plate of an inspection device according to an exemplary embodiment of the present disclosure.

The obtained wavefront aberration, however, may also include the aberration generated in the pupil relay lens 22. To remove this, in an embodiment, a null plate 56 is used. FIG. 4 is a plan diagram of a Null plate 56 of an inspection device 1 according to an exemplary embodiment.

As illustrated in FIG. 4, in an embodiment, the null plate 56 includes two small holes 57 and 58 formed therein. The small hole 57 is formed in the same position as the large hole 51 in the PDI plate 50. The small hole 58 is formed in the same position as the small hole 52 in the PDI plate 50. The inner diameter of the small hole 57 of the null plate 56 is less than the inner diameter of the large hole 51 of the PDI plate 50. The small hole 57 and the small hole 58 of the null plate 56 have the same inner diameter as the small hole 52 of the PDI plate 50.

Instead of the PDI plate 50, the Null plate 56 is used, and a fringe image scanning is performed in the same manner as with the PDI plate 50, using the small hole 57 and the small hole 58 of the null plate 56. Accordingly, the aberration generated in the pupil relay lens 22 can be measured. By subtracting the aberration measured using the null plate 56 from the aberration measured using the PDI plate 50, the wavefront aberration generated by the objective lens 20 and the pupil relay lens 21 can be measured with high precision.

One method of measuring the wavefront aberration from the fringe image uses a Fourier transform from one fringe image of one phase. In this case, since a fringe image with a finer pitch is used, the pitch of the diffraction grating 40 is ½ of that of the fringe image scanning method, to obtain the doubled or more inclination angle of the interference. In general, the fringe image scanning method is more precise than the Fourier method.

In an exemplary embodiment, the diffraction grating 40 and the PDI plate 50 are permanently provided, and other members are switchable, so that they can be withdrawn from the optical path of the sample inspection system when measurements are not being carried out. In the vicinity of the intermediate imaging plane 35 on which the diffraction grating 40 and the PDI plate 50 are disposed, there are usually no functional elements other than a field stop. For this reason, since there is room for installation, permanent installation is possible.

In addition, the vicinity of the intermediate imaging plane 35 may be a space where an image is magnified by 50 to 70 times, for example. For this reason, a relatively large space dimension is ensured. Since the luminous flux is NA/(50 to 70), unintentional luminous flux vignetting is also avoided. The diffraction grating 40 and the PDI plate 50 may be integrated with each other, which would increase the stability of the interferometric system. Alternatively, the diffraction grating 40 and the PDI plate 50 would be mounted during an aberration measurement, using, for example, jig tools.

Sample Test Method

Figure 5:
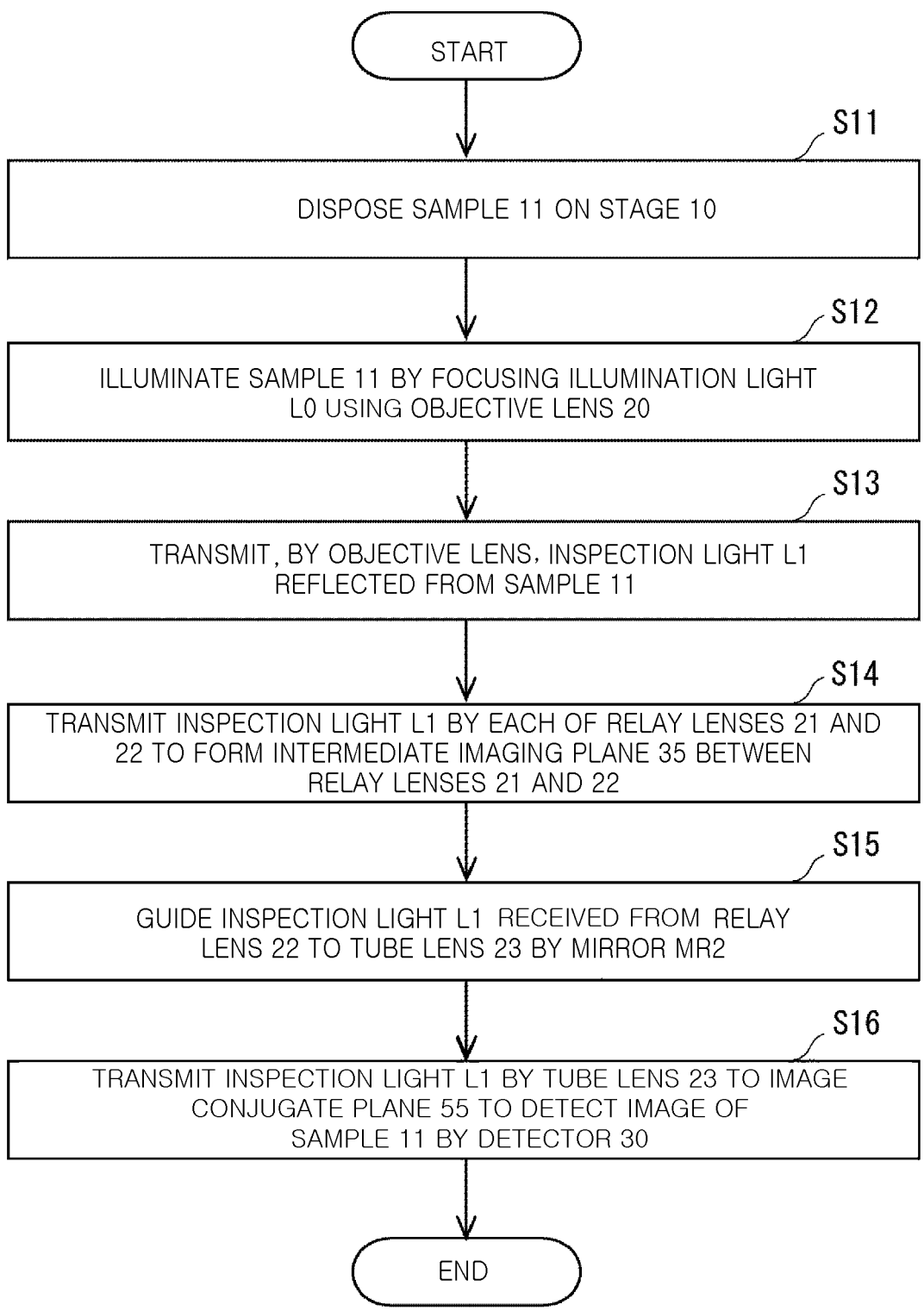
FIG. 5 is a flowchart of an inspection method that uses an inspection device according to an exemplary embodiment of the present disclosure.

A sample inspection method according to an exemplary embodiment will be described with reference to a flowchart. FIG. 5 is a flowchart of an inspection method that uses an inspection device 1 according to an exemplary embodiment.

As indicated in step S11 in FIG. 5, in an embodiment, the sample 11 is disposed on the stage 10. Thereafter, as indicated in step S12, the illumination light L0 is focused by the objective lens 20 to illuminate the sample 11. As indicated in step S13, the illumination light L0 reflected by the sample 11 becomes inspection light L1 that propagates through the objective lens 20, and the objective lens 20 converts the inspection light L1 into parallel light.

As indicated in step S14, the inspection light L1 propagates through the pupil relay lens 21 and the pupil relay lens 22 by relaying the relay lenses such that an intermediate imaging plane forms between the pupil relay lens 21 and the pupil relay lens 22. As indicated in step S15, the inspection light L1 received from the pupil relay lens 22 is reflected to the tube lens 23 by the mirror MR2. As indicated in step S16, the inspection light L1 propagates through the tube lens 23 to the imaging conjugate plane 55 of the detector 30, and the image of the sample 11 is detected by the detector 30 disposed on the imaging conjugate plane 55. Accordingly, the inspection device 1 can inspect the sample 11.

Wavefront Aberration Measurement Method

Figure 6:
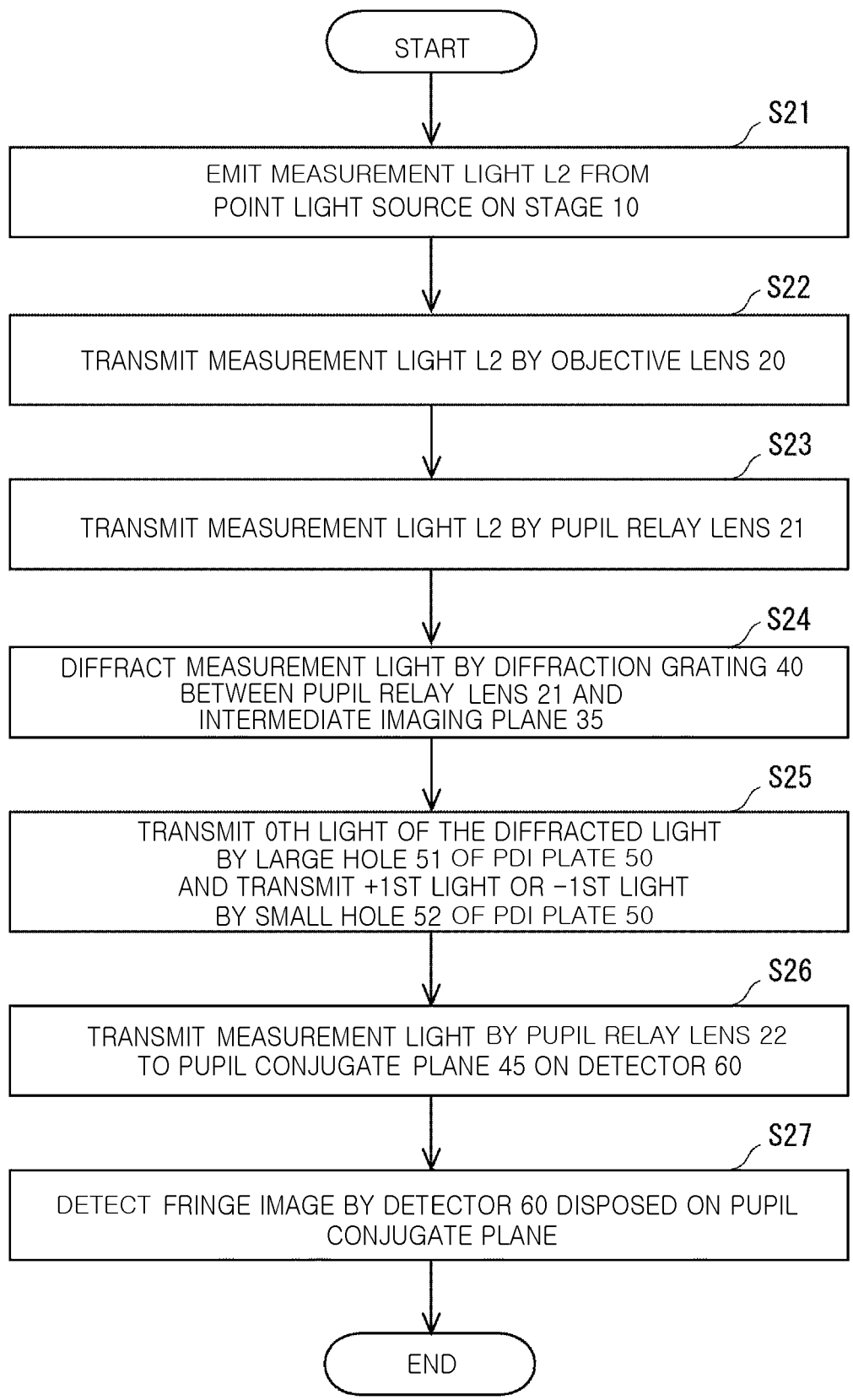
FIG. 6 is a flowchart of a method of measuring wavefront aberration using an inspection device according to an exemplary embodiment of the present disclosure.

A method of measuring wavefront aberration according to an exemplary embodiment will be described with reference to a flowchart. FIG. 6 is a flowchart of a method of measuring wavefront aberration using an inspection device 1 according to an exemplary embodiment.

As indicated in step S21 in FIG. 6, in an embodiment, a point light source is disposed on the stage 10. Specifically, the point light source generating unit 12 is disposed on the stage 10 of the inspection device 1, and the measurement light L2 is emitted from the point light source arranged in the same position as the sample surface 15.

As indicated in step S22, the measurement light L2 emitted from the point light source propagates through the objective lens 20. Accordingly, the measurement light L2 becomes the distorted plane wave 17 that includes the aberration of the objective lens 20.

As indicated in step S23, the measurement light L2 that received from the objective lens 20 propagates through the pupil relay lens 21. Accordingly, the measurement light L2 becomes the distorted spherical wave 18 that includes the aberration of the objective lens 20 and the pupil relay lens 21.

As indicated in step S24, the measurement light is diffracted by the diffraction grating 40 disposed between the pupil relay lens 21 and the intermediate imaging plane 35.

The PDI plate 50 that includes the large hole 51 and the small hole 52 is disposed within the depth of focus of the intermediate imaging plane 35, where the large hole 51 is disposed on the optical axis of the measurement light L2, and the small hole 52 is spaced apart from the large hole 51. As indicated in step S25, the light diffracted by the diffraction grating 40 propagates through the large hole 51 and the small hole 52. Specifically, the 0th light of the diffracted light propagates through the large hole 51 and the +1st light or the −1st light propagates through the small hole 52.

As indicated in step S26, the measurement light L2 propagates through the pupil relay lens 22 to the pupil conjugate plane 45 on the detector 60, where the mirror MR2 is withdrawn from the main light path of the inspection device 1.

As indicated in step S27, the fringe image is detected by the detector 60 disposed on the pupil conjugate plane 45. Accordingly, the aberration wavefronts of the objective lens 20 and the pupil relay lens 21 can be measured from the fringe image. Accordingly, the aberration wavefront may be measured.

The effect of an exemplary embodiment will be described. In the inspection device 1 of the exemplary embodiment, by adding the point light source generating unit 12, the diffraction grating 40 and the PDI plate 50 to the inspection device 1 of the sample 11, wavefront aberration of the objective lens 20 and the pupil relay lens 21 can be measured. Accordingly, without using expensive components, and also without affecting the optical path of the sample inspection system, imaging performance when the objective lens 20 and the pupil relay lens 21 are combined can be measured in-situ.

In addition, in an embodiment, the NA of the objective lens 20 is larger than the NA of the pupil relay lens 21. Thus, the objective lens 20 and the pupil relay lens 21 are an enlarging optical system, which differs from a reduction optical system such as a stepper. Accordingly, the magnification of the intermediate imaging plane 35 is 50 times or more, and a spatial margin is obtained. Accordingly, optical members such as the diffraction grating 40 and the PDI plate 50 are disposed on the intermediate imaging plane 35.

In addition, in an embodiment, the spacing of the line and space pattern of the diffraction grating 40, and the sizes of the large hole 51 and the small hole 52 of the PDI plate 50 are increased by the order of several tens of microns. Accordingly, the cost of manufacturing optical members such as the diffraction grating 40 and the PDI plate 50 can be reduced. Thus, even when the gratings of the diffraction grating 40, the large hole 51, and the small hole 52 are hollow, mechanical strength can be maintained.

By disposing the pupil relay lens 22, the detector 60 that detects a fringe image is disposed on the pupil conjugate plane 45, and the fringe image can be analyzed with high precision. In addition, since the detector 60 is disposed on the pupil conjugate plane 45, the inspection device 1 has a compact size. The objective lens 20 and the pupil relay lenses 21 and 22 are optical members used in a general semiconductor inspection, and are also used for aberration measurement in an exemplary embodiment, and thus there is no need to add a new lens system, which simplifies the configuration thereof.

The inner diameter $\Phi r$ of the small hole 52 is determined by in an equation that includes the measurement wavelength, the NA of the objective lens 20, and the intermediate image magnification. Accordingly, the condition of the small hole 52 reset to the spherical wave 16 is prescribed, and the reference wave RW approximates the ideal spherical wave 16. Accordingly, the wavefront aberration can be measured with high precision.

A thickness of the periphery of the large hole 51 and the small hole 52 in the PDI plate 50 is determined by an equation that includes the measurement wavelength, the NA of the objective lens 20, and the intermediate image magnification. Accordingly, the condition of the small hole 52 reset to the spherical wave 16 is prescribed, and the reference wave RW approximates an ideal spherical wave. Accordingly, the wavefront aberration can be measured with high precision.

Furthermore, the semiconductor manufacturing line can be managed using the measurement result in-situ. In addition, using the result of aberration measurement, optical devices, such as an illumination pupil filter or an imaging pupil filter, can be designed that improve the imaging performance of the inspection device 1. In addition, a measure that corrects the difference in imaging performance between the plurality of inspection devices 1 can be designed.

An inspection device will be described according to an exemplary embodiment. The inspection device 1 in an exemplary embodiment described above inspects the sample 11 at an arbitrary wavelength and measures the wavefront aberration with respect to a sample inspection system and an aberration measurement system in-situ. An inspection device in a present exemplary embodiment inspects the sample 11 and measures the wavefront aberration using a plurality of wavelength bands, hereinafter, referred to as bands, within the optical wavelength.

For example, in an embodiment, the point light source generating unit 12 mounted on the stage 10 uses a DPSS laser whose wavelengths are 266 nm, 355 nm, 375 nm, 430 nm, 457 nm, 501 nm, etc. The measurement laser wavelengths correspond to the inspection wavelengths for semiconductor inspection. For example, the central wavelength or a center of gravity wavelength of the inspection wavelength band is the measurement wavelength. The focusing lens and the pinhole plate 14 in the point light source generating unit 12 are designed based on the wavelength. Accordingly, the point light source generating unit 12 is prepared in line with the wavelengths. The diameters of the large hole 51 and the small hole 52 in the PDI plate are based on the above-mentioned equations (1) and (2) and depend on the wavelength of the inspection light L2.

Further, the distance D (spacing) between the center of the large hole 51 and the center of the small hole 52 is determined by equation (4), below, and depends on the wavelength of the inspection light L2:

$$D = L \cdot \tan(\sin^{-1}(\lambda/P)). \quad (4)$$

In the equation, L represents the distance in the optical axis direction between the diffraction grating 40 and the PDI plate 50, P represents the pitch of the grating in the diffraction grating 40, and $\lambda$ represents the wavelength of the measurement light L12. For example, when L is 70 mm, P is 30 μm, and $\lambda$ is 266 nm, D is 0.6 mm.

Since the selection of diffracted light at D in the PDI plate 50 is possible, a common diffraction grating 40 may be used at each wavelength.

Figure 7:
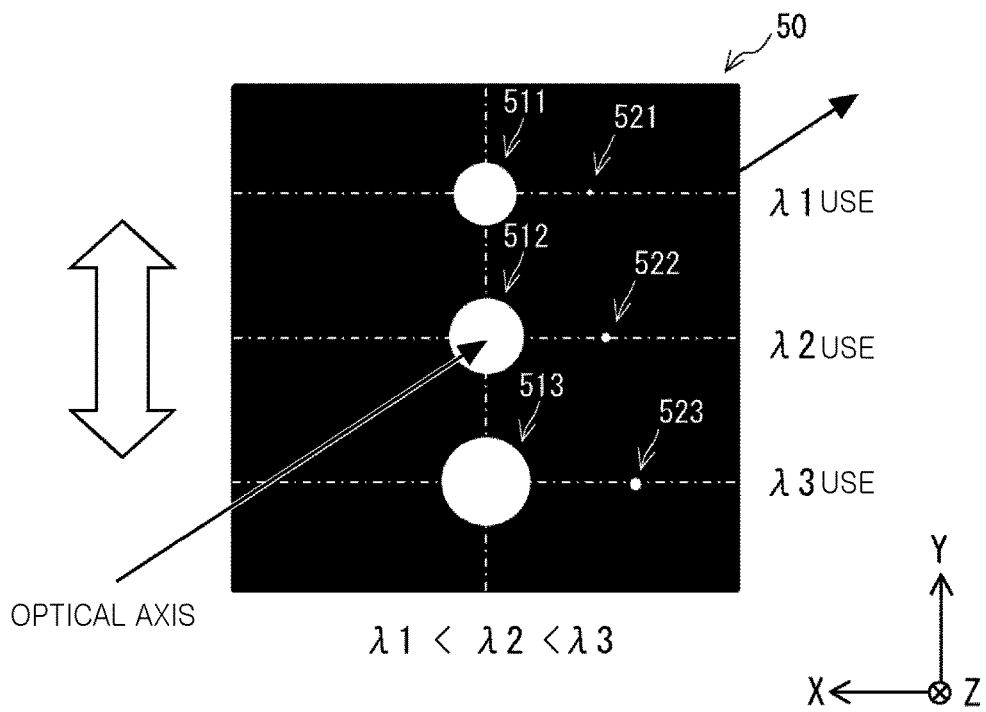
FIG. 7 is a plan diagram of a PDI plate of an inspection device according to an exemplary embodiment of the present disclosure.

FIG. 7 is a plan diagram of a PDI plate 50 of an inspection device according to an exemplary embodiment.

As illustrated in FIG. 7, in an embodiment, the PDI plate 50 includes a pair of a large hole 51 and a small hole 52 for each wavelength $\lambda 1$, $\lambda 2$, $\lambda 3$ ($\lambda 1 < \lambda 2 < \lambda 3$) to be measured. For example, a large hole 511 and a small hole 521 correspond to wavelength $\lambda 1$, a large hole 512 and a small hole 522 correspond to wavelength $\lambda 2$, and a large hole 513 and a small hole 523 correspond to wavelength $\lambda 3$. Depending on the wavelength, the PDI plate 50 is shifted in a direction, such as the Y-axis direction in the drawing, perpendicular to the diffraction direction of the diffraction grating 40.

As described above, in an exemplary embodiment, the PDI plate 50 includes the large hole 511, the small hole 521, the large hole 512, the small hole 522, and the large hole 513, and the small hole 523. The measurement light L2 includes the first measurement light of the wavelength λ1, the second measurement light of the wavelength λ2, and the third measurement light of the wavelength λ3. The large hole 511, the small hole 521, and the wavelength λ1 satisfy equations (1), (2) and (4), the large hole 512, the small hole 522 and the wavelength λ2 satisfy equations (1), (2) and (4), and the large hole 513, the small hole 523 and the wavelength λ3 satisfy equations (1), (2) and (4). In this case, when the measurement light L2 changes from the first measurement light to the second measurement light, the PDI plate 50 is shifted, so that a state in which the first measurement light propagates through the large hole 511 and the small hole 521 changes to a state in which the second measurement light propagates through the large hole 512 and the small hole 522. When the measurement light L2 changes from the second measurement light to the third measurement light, the PDI plate 50 is shifted, so that a state in which the second measurement light propagates through the large hole 512 and the small hole 522 changes to the state in which the third measurement light propagates through the large hole 513 and the small hole 523.

According to an exemplary embodiment, since a wavelength-dependent optical material is not used, an exemplary embodiment can also be used with the inspection device 1 that uses a multi-wavelength band by changing the optical parameters, such as equations (1)-(4). Other configurations and effects are included in the description of an exemplary embodiment described with reference to FIGS. 1-4.

An inspection device will be described according to an exemplary embodiment. An inspection device in an exemplary embodiment inspects the sample 11 and measures the wavefront aberration by changing an image height. Since the point light source generating unit 12 is disposed on the stage 10, the image height for measuring and evaluating the aberration are changed by moving the stage 10. Accordingly, the PDI plate 50 moves in the X-Y plane.

Figure 8:
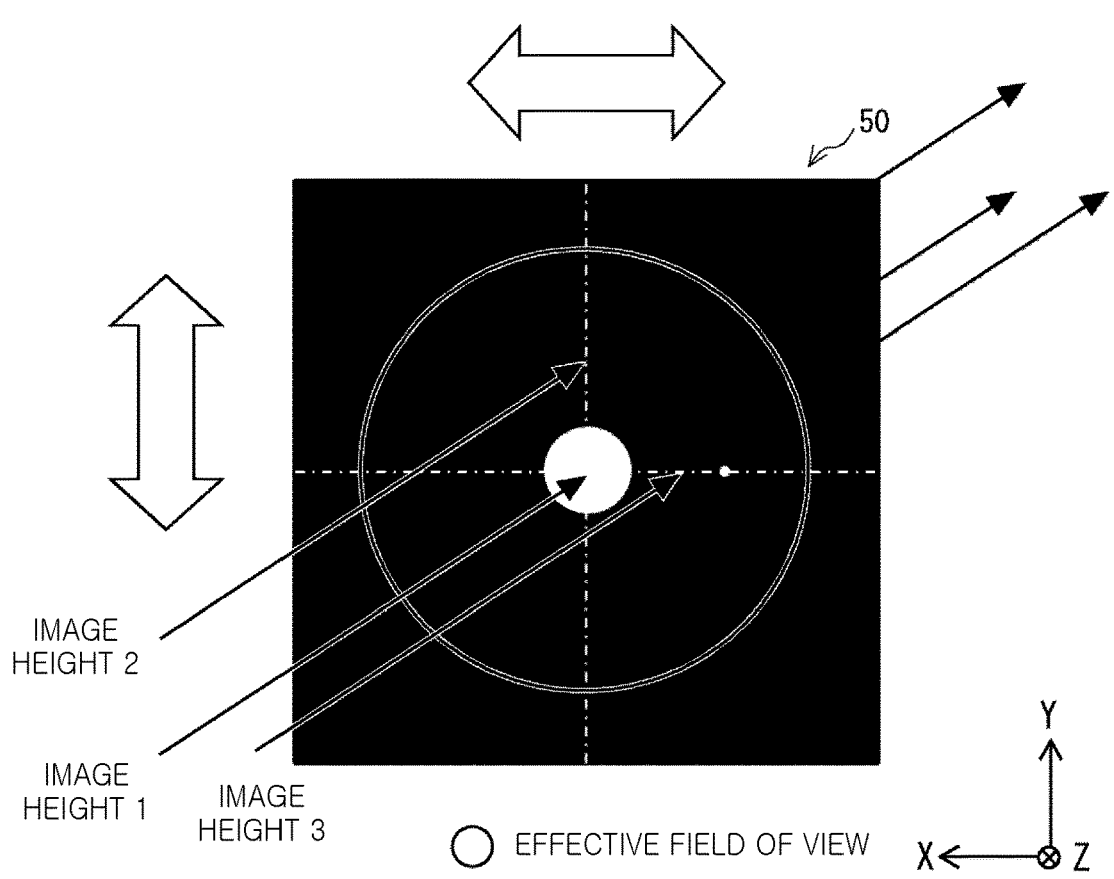
FIG. 8 is a plan diagram of a PDI plate of an inspection device according to an exemplary embodiment of the present disclosure.

FIG. 8 is a plan diagram of a PDI plate 50 of an inspection device according to an exemplary embodiment.

As illustrated in FIG. 8, in an embodiment, when the coordinates of the pinhole 13 on the sample surface 15 in the point light source generating unit 12 are shifted from the optical axis of the objective lens 20 by Δ in the Y-axis direction, where the image height Y=Δ, the PDI plate 50 is also shifted by M×Δ in the Y direction, where M is the magnification of the intermediate imaging plane. The field of view on the sample 11 of the objective lens 20 is ΦS. Accordingly, the PDI plate 50 moves in the Y-axis direction by ±(S/2)×M. The diffraction grating 40 has a large effective area with respect to the fluctuation of the image height.

As described above, in an exemplary embodiment, when the point light source is moved within the field of view of the objective lens 20 on a plane orthogonal to the optical axis of the objective lens 20, the PDI plate 50 is moved by an amount obtained by multiplying the displacement of the point light source by the magnification of the intermediate imaging plane 35.

According to an exemplary embodiment, the position on the X-Y plane of the point light source generating unit 12 and the position on the X-Y plane of the PDI plate 50 are linked to measure the wavefront aberration. Accordingly, the wavefront aberration at an arbitrary image height within the field of view of the objective lens 20 can be measured. Other configurations and effects are included in the descriptions of exemplary embodiments of FIGS. 1-4 and 7.

According to exemplary embodiments, an inspection device and a method of measuring wavefront aberration can measure wavefront aberration and the imaging performance of an optical inspection device in-situ with high precision.

While the exemplary embodiments have been illustrated and described above, it will be apparent to those skilled in the art that modifications and variations could be made without departing from the scope of embodiments of the present disclosure as defined by the appended claims.

What is claimed is:

1. An inspection device, comprising:
   a stage that accommodates a sample during an inspection and a point light source during an aberration measurement;
   an objective lens that transmits inspection light formed by illumination light that illuminates the sample and is reflected from the sample during the inspection, and that transmits measurement light emitted from the point light source during the aberration measurement;
   a first lens that transmits the inspection light and the measurement light received from the objective lens;
   a second lens that transmits the inspection light and the measurement light received from the first lens, wherein an intermediate imaging plane is formed between the first lens and the second lens;
   a diffraction grating disposed between the first lens and the intermediate imaging plane and that diffracts the measurement light; and
   a point diffraction interferometry (PDI) plate disposed within a range of a depth of focus of the intermediate imaging plane, wherein the PDI plate includes a large hole and a small hole that has an inner diameter that is smaller than that of the large hole, wherein the large hole is disposed on an optical axis of the measurement light and the small hole is spaced apart from the large hole, and wherein the PDI plate transmits light diffracted by the diffraction grating;
   wherein the diffraction grating and the PDI plate are withdrawn from an optical path of the inspection light during the inspection.

2. The inspection device of claim 1, wherein the first lens has a focal length longer than a focal length of the objective lens.

3. The inspection device of claim 1, wherein a magnification on the intermediate imaging plane as determined by a ratio of a focal length of the objective lens and a focal length of the first lens is 50 times or more.

4. The inspection device of claim 1, wherein gratings of the diffraction grating, the large hole, and the small hole are hollow.

5. The inspection device of claim 1,
   wherein the illumination light includes a plurality of inspection wavelengths, and
   wherein the measurement light has a wavelength within an inspection wavelength band of the illumination light, wherein the inspection wavelength band includes a central wavelength or a center of gravity wavelength,
   wherein an inner diameter Φt of the large hole satisfies:

$$\Phi t > 30 \cdot 0.61 \cdot \lambda/(NA/M) \qquad (A),$$

an inner diameter Φr of the small hole satisfies:

$$\Phi r < 0.61 \cdot \lambda(NA/M) \qquad (B), \text{ and}$$

a distance D between a center of the large hole and a center of the small hole satisfies:

$$D = L \sim \tan(\sin^{-1}(\lambda/P)) \qquad (C),$$

wherein λ is a wavelength of the measurement light, NA is a number of apertures of the objective lens, M is a magnification on the intermediate imaging plane as determined by a ratio of a focal length of the objective lens and a focal length of the first lens, L is a distance between the diffraction grating and the PDI plate in an optical axis direction, and P is a pitch of each grating of the diffraction grating.

6. The inspection device of claim 5, wherein the PDI plate includes a first large hole, a first small hole, a second large hole and a second small hole that respectively correspond to the plurality of inspection wavelengths, wherein the measurement light includes a first measurement light that has a first measurement wavelength that corresponds to the first inspection wavelength of the inspection light and a second measurement light that has a second measurement wavelength that corresponds to the second inspection wavelength of the inspection light, and wherein, when the first large hole, the first small hole, and the first measurement wavelength satisfy equations (A), (B) and (C), the second large hole, the second small hole, and the second measurement wavelength satisfy equations (A), (B) and (C), and the measurement light changes from the first measurement light to the second measurement light, the PDI plate is shifted, and a state in which the first measurement light propagates through the first large hole and the first small hole changes to a state in which the second measurement light propagates through the second large hole and the second small hole.

7. The inspection device of claim 5, wherein a thickness a of a periphery of the large hole and the small hole in the PDI plate satisfies:

$$a < \lambda/(NA/M) \quad (D),\text{ and}$$

wherein a thickness of a portion that surrounds the periphery of the PDI plate is at least twice the thickness a of the periphery of the large hole and the small hole.

8. The inspection device of claim 1, wherein, when the point light source moves within a plane orthogonal to the optical axis of the objective lens within a field of view of the objective lens, the PDI plate is displaced by an amount obtained by multiplying a displacement of the point light source by a magnification of the intermediate imaging plane as determined by a ratio of a focal length of the objective lens and a focal length of the first lens.

9. The inspection device of claim 1, wherein a pupil plane is formed between the objective lens and the first lens.

10. The inspection device of claim 1, further comprising:
a first detector disposed on an imaging conjugate plane of the inspection light received from the second lens and a tube lens, and is configured to detect an image of the sample;
a second detector disposed on a pupil conjugate plane of the measurement light received from the second lens and is configured to detect a fringe image of the measurement light; and
a mirror disposed between the second lens and the tube lens, and configured to be switched between the inspection and the aberration measurement.

11. A method of measuring wavefront aberration of an inspection device, the method comprising:
disposing a point light source on a stage;
transmitting measurement light emitted from the point light source by an objective lens;
transmitting the measurement light received from the objective lens by a first lens;
diffracting the measurement light received from the first lens by a diffraction grating disposed between the first lens and an intermediate imaging plane;
transmitting the measurement light received from the diffraction grating by a PDI plate disposed within a depth of focus of the intermediate imaging plane, wherein the PDI plate includes a large hole disposed on an optical axis of the measurement light, a small hole spaced apart from the large hole and whose an inner diameter is smaller than that of the large hole;
transmitting the measurement light received from the PDI plate by a second lens, wherein the intermediate imaging plane is formed between the first lens and the second lens; and
detecting a fringe image of the measurement light received from the second lens by a second detector disposed on a pupil conjugate plane of the measurement light.

12. The method of claim 11, wherein the first lens has a focal length longer than a focal length of the objective lens.

13. The method of claim 11, wherein a magnification on the intermediate imaging plane as determined by a ratio of a focal length of the objective lens and a focal length of the first lens is 50 times or more.

14. The method of claim 11, wherein gratings of the diffraction grating, the large hole, and the small hole are hollow.

15. The method of claim 11, further comprising:
disposing a sample on the stage; and
illuminating the sample wherein illumination light is reflected from the sample, wherein the illumination light includes a plurality of inspection wavelengths, and wherein the illumination light reflected from the sample becomes inspection light;
transmitting, by the objective lens, the inspection light wherein the objective lens converts the inspection light into parallel light;
transmitting, by the first lens, the inspection light, wherein an intermediate imaging plane forms between the first lens and the second lens;
transmitting, by the second lens, the inspection light, wherein the inspection light is reflected by a mirror to a tube lens; and
transmitting, by the tube lens, the inspection light to an imaging conjugate plane of a first detector, wherein an image of the sample is detected.

16. The method of claim 15, wherein the measurement light has a wavelength within an inspection wavelength band of the illumination light, wherein the inspection wavelength band includes a central wavelength or a center of gravity wavelength, wherein an inner diameter $\Phi t$ of the large hole satisfies:

$$\Phi t > 30 \cdot 0.61 \cdot \lambda(NA/M) \quad (A),$$

an inner diameter $\Phi r$ of the small hole satisfies:

$$\Phi r < 0.61 \cdot \lambda(NA/M) \quad (B),\text{ and}$$

a distance D between a center of the large hole and a center of the small hole satisfies:

$$D = L \cdot \tan(\sin^{-1}(\lambda/P)) \quad (C),$$

wherein $\lambda$ is a wavelength of the measurement light is $\lambda$, NA is a number of apertures of the objective lens, M is a magnification on the intermediate imaging plane as determined by a ratio of a focal length of the objective lens and a focal length of the first lens, L is a distance between the diffraction grating and the PDI plate in an optical axis direction, and P is a pitch of each grating of the diffraction grating.

17. The method of claim 16, wherein the PDI plate includes a first large hole, a first small hole, a second large hole and a second small hole that respectively correspond to the plurality of inspection wavelengths,
wherein the measurement light includes a first measurement light that has a first measurement wavelength that corresponds to the first inspection wavelength of the inspection light, and a second measurement light that has a second measurement wavelength that corresponds to the second inspection wavelength of the inspection light, and
wherein, when the first large hole, the first small hole, and the first measurement wavelength satisfy equations (A), (B) and (C), the second large hole, the second small hole, and the second measurement wavelength satisfy equations (A), (B) and (C), and the measurement light changes from the first measurement light to the second measurement light, the PDI plate is shifted, and a state in which the first measurement light propagates through the first large hole and the first small hole changes to a state in which the second measurement light propagates through the second large hole and the second small hole.

18. The method of claim 16,
wherein a thickness a of periphery of the large hole and the small hole in the PDI plate satisfies:

$$a < \lambda/(NA/M) \qquad (D),\text{ and}$$

wherein a thickness of a portion that surrounds the periphery of the PDI plate is at least twice the thickness a of the periphery of the large hole and the small hole.

19. The method of claim 11, wherein, when the point light source moves within a plane orthogonal to the optical axis of the objective lens within a field of view of the objective lens, the PDI plate is displaced by an amount obtained by multiplying a displacement of the point light source by a magnification of the intermediate imaging plane as determined by a ratio between a focal length of the objective lens and a focal length of the first lens.

20. The method of claim 11, wherein a pupil plane is formed between the objective lens and the first lens.

* * * * *